Figure 1:
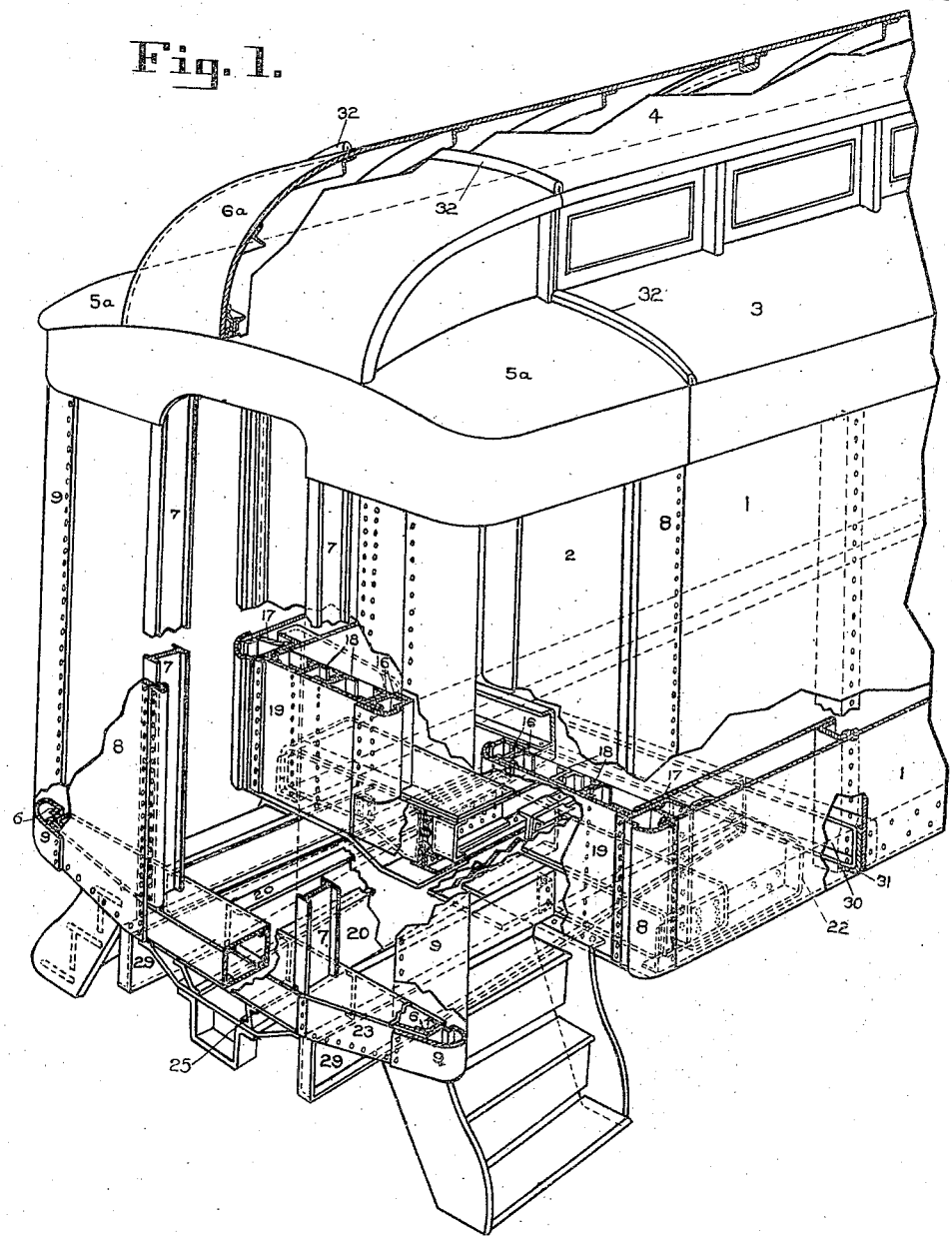

A. J. STEVENS & J. H. HORNE.
CAR.
APPLICATION FILED AUG. 12, 1912.

1,080,024.

Patented Dec. 2, 1913.

5 SHEETS—SHEET 4.

Attest.
E. B. Lehman
Wm. P. Pasco

Inventors.
ARTHUR J. STEVENS.
JAMES H. HORNE.
BY Toulmin & Reed
ATTYS.

A. J. STEVENS & J. H. HORNE.
CAR.
APPLICATION FILED AUG. 12, 1912.
1,080,024.
Patented Dec. 2, 1913.
5 SHEETS—SHEET 5.
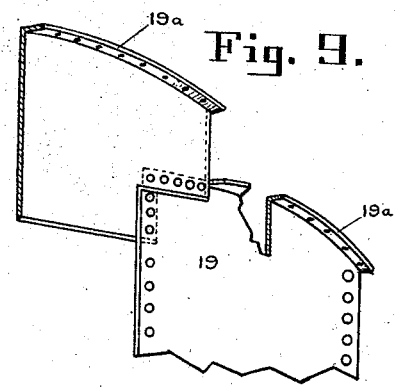
Fig. 9.
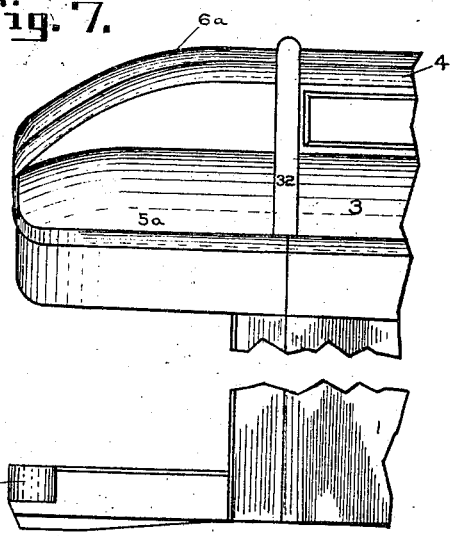
Fig. 7.
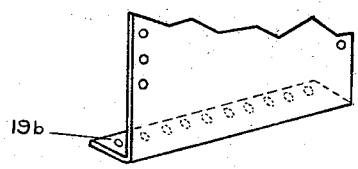
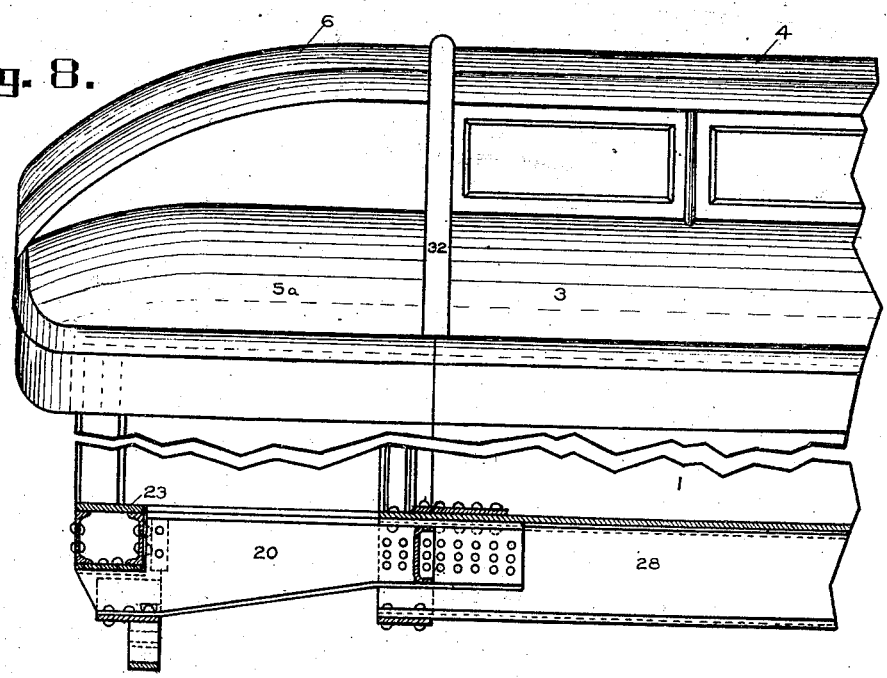
Fig. 8.
Attest.
E. B. Lehman
Adam J. Heckel.
Inventors.
ARTHUR J. STEVENS.
JAMES H. HORNE.
BY Toulmin & Reed
ATTYS.

UNITED STATES PATENT OFFICE.

ARTHUR J. STEVENS AND JAMES H. HORNE, OF DAYTON, OHIO, ASSIGNORS TO THE BARNEY AND SMITH CAR COMPANY, OF DAYTON, OHIO, A CORPORATION OF WEST VIRGINIA.

CAR.

1,080,024.  Specification of Letters Patent.  Patented Dec. 2, 1913.

Application filed August 12, 1912. Serial No. 714,510.

*To all whom it may concern:*

Be it known that we, ARTHUR J. STEVENS and JAMES H. HORNE, citizens of the United States, residing at Dayton, in the county of Montgomery and State of Ohio, have invented certain new and useful Improvements in Cars, of which the following is a specification, reference being had therein to the accompanying drawing.
This invention relates to cars and more particularly to the various types of passenger cars which are provided at their ends with vestibules divided from the body portion or passenger compartment of the car by partitions and doors.

The object of the invention is to protect the body portion of the car from injury when the car as a whole is subjected to abnormal shocks, such as would be caused by a collision or similar accident, thus protecting the passengers from loss of life and injury.

To this end it is a further object of the invention to so construct the car as a whole that the vestibule or platform extension will yield, as by crushing or collapsing, when subjected to a shock or strain greater than the normal service shocks and strains and in yielding will absorb a large portion of the shock, thus eliminating or materially reducing the impact between the ends of the body portions of the cars and to a corresponding extent preventing or reducing the injury to the body portions of the cars. The ordinary vestibule or platform extension is about four feet in length, thus providing approximately eight feet of crushable or collapsible structure between the adjacent ends of two cars.
In a train comprising a number of cars it will be obvious that there will be a very large amount of crushable material and, consequently, the force of a very severe shock would be absorbed by the crushing or collapsing of this material without injury to the body portions or passenger compartments of the cars. To accomplish this end the vestibules or platform extensions are constructed separately from and independently of the body portion of the car and are made of a lighter construction which, while of sufficient strength to withstand all ordinary or normal service shocks is of less strength than the structure of the body portion of the car, and, under abnormal shock,
will crush or collapse against the end of the car. These separate vestibules or platforms are connected with the body portion of the car in such a manner that the connection will be separated or broken to permit of the collapsing or crushing of the vestibule and further to permit of the removal and replacing of the damaged vestibule without affecting the structure of the body portion of the car. To further protect the body portion of the car we provide the vestibules or platform extensions with anti-climbing devices which lessen or entirely avoid the tendency of one car to rise above or climb over another car in case of collision, and which also tend to confine the force of the shock to the platform and other timbers or frame construction which have the greatest strength and offer the greatest resistance to the shock, thus tending to prevent one car from telescoping another.

With our improved construction, in case of a collision or wreck in which the cars are subjected to a lengthwise shock of sufficient force to materially injure the cars, the connections between the platforms or vestibules and the bodies of their respective cars will be broken, thus permitting the vestibule doors, hoods, platform and steps to be crushed or collapsed against the ends of the body portions of the cars. This collapsing or crushing of the vestibules will absorb a great deal of the energy of the shock and the force of the same will, in most cases, be so lost or reduced before the ends of the body portions of the cars come together as to effectually protect the latter and their occupants from injury.

Figure 2:
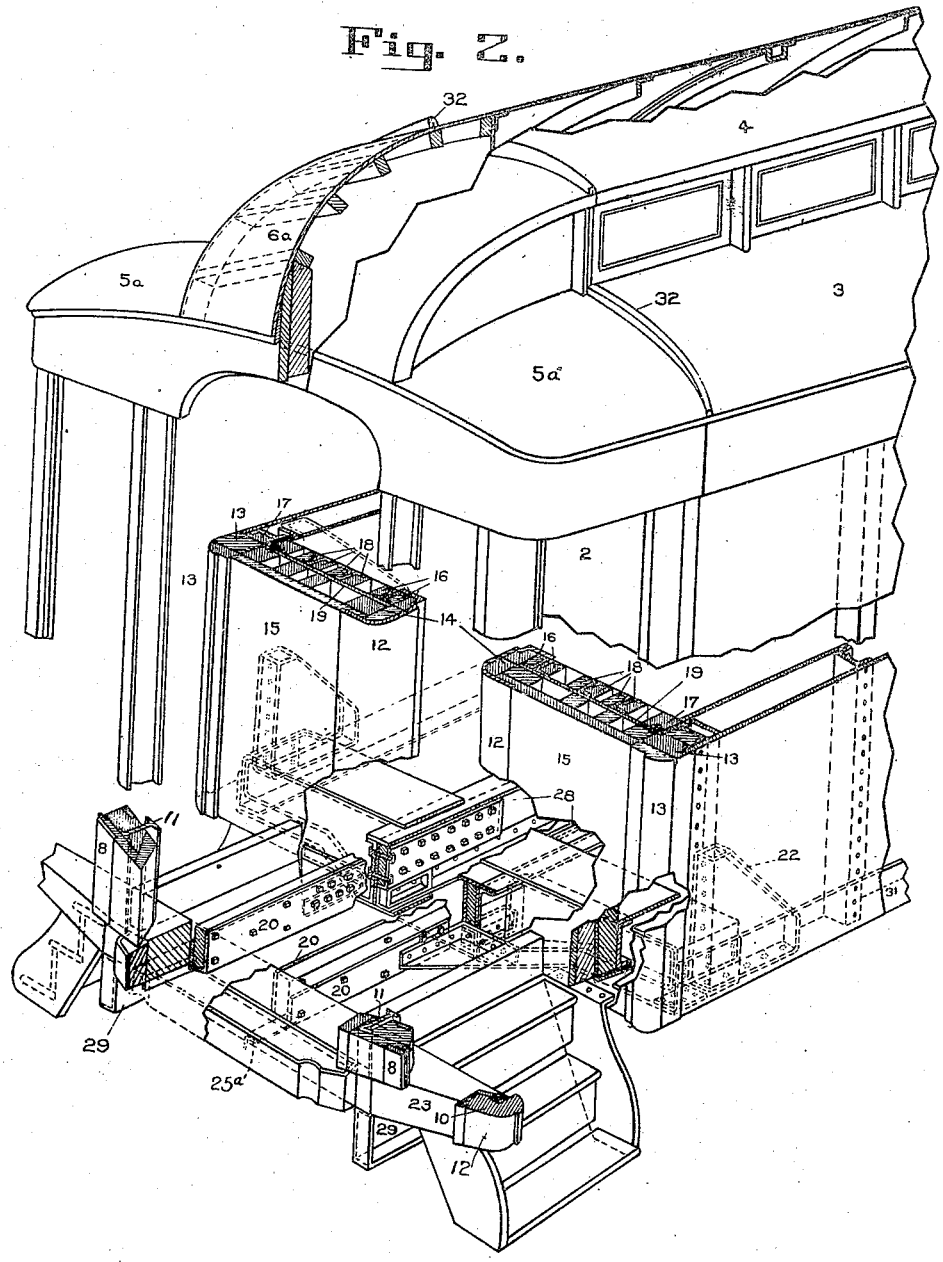
Figure 3:
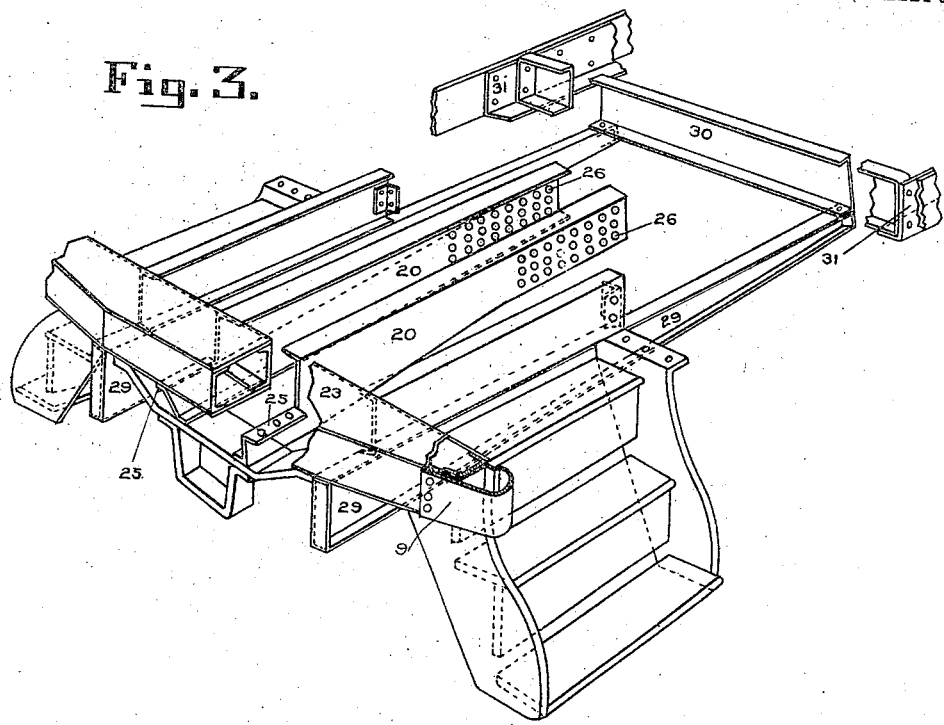
Figure 4:
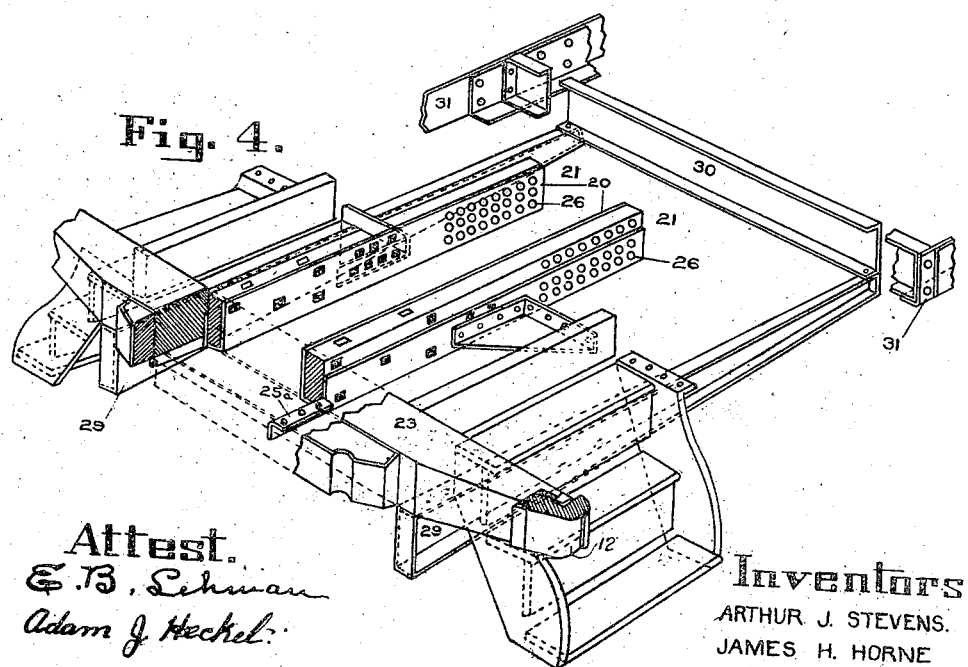
Figure 5:
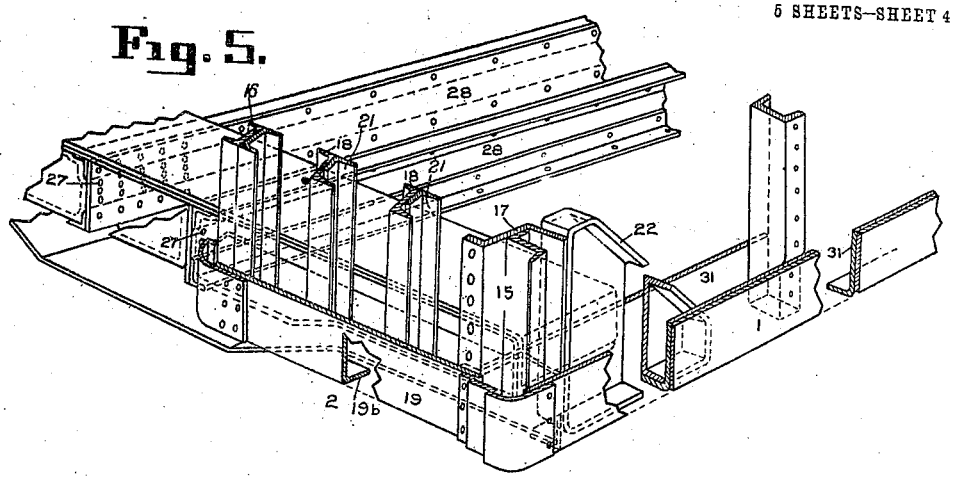
Figure 6:
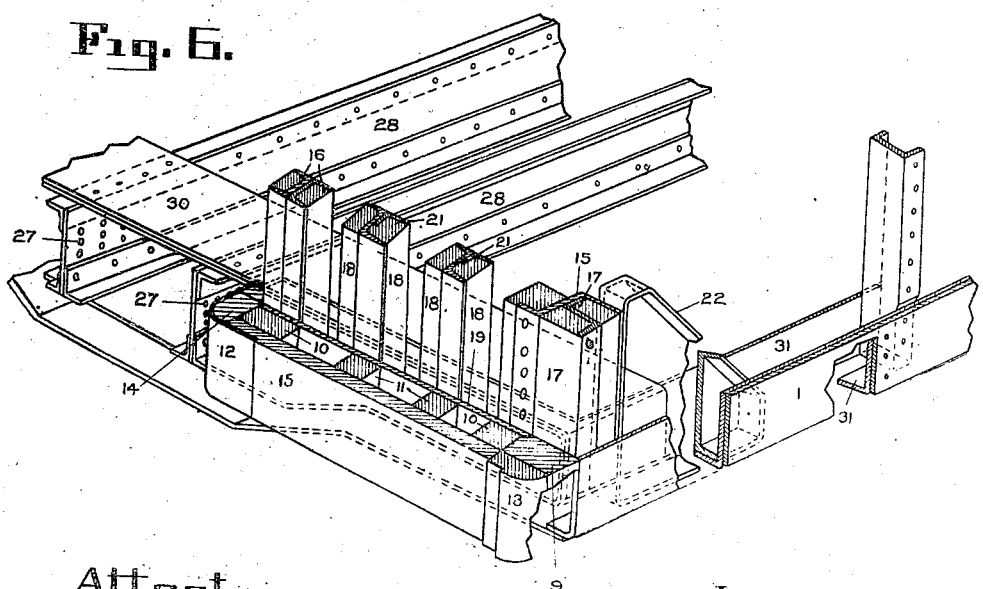

In the accompanying drawings, Figure 1 is a broken perspective view of one end and a portion of one side of a steel passenger car body and vestibule end thereof, the floors being removed; Fig. 2 is a view similar to Fig. 1 showing a modification of the construction shown therein and showing a rear wall to the vestibule in addition to the end wall of the body of the car; Fig. 3 is a broken perspective view of the steel framework of the vestibule platform, detached from the body of the car and showing the application of the anti-climbing device; Fig. 4 is a view similar to Fig. 3 showing a modification of the construction shown therein; Fig. 5 is a broken perspective view showing the end framing of the body of a steel passenger car, as shown in Fig. 1, the vestibule and platform being removed; Fig. 6 is a view similar to Fig. 5 showing a modification thereof as represented in Fig. 2, and showing a portion of the rear wall of the vestibule attached to the end of the car body; Fig. 7 is a broken side elevation of a portion of the construction shown in Fig. 1 showing the vestibule end attached to the car body; Fig. 8 is a view similar to Fig. 7 showing the manner of attaching the platform sills to the longitudinal body sills of the car; Fig. 9 is a broken perspective elevation of one-half of the end plate of the car body, showing the manner of constructing the same, looking from the outside of the end of the car body.

In these drawings we have illustrated one embodiment of our invention and have shown this embodiment as applied both to an all steel car, (Figs. 1, 3 and 5), and to a car constructed largely of wood, (Figs. 2, 4 and 6), it being obvious that the invention will lend itself readily to use with either an all steel car, an all wood car or a car composed of both steel and wood.

In illustrating the invention we have shown various parts common in car construction which have no relation to our invention and we have, therefore, omitted reference to them and have described only such parts of the car structure as are necessary to an understanding of the invention.

In that embodiment of the invention illustrated in the drawings the body portion or passenger compartment of the car comprises the sides 1 and the ends 2, only one side and one end being shown, the lower deck roof 3 and the upper deck roof 4. This body portion of the car is complete in itself and comprises the usual main sills 28 which extend longitudinally of said car and which, together with the side sills 31 and cross members 30, comprise the frame or base of the body portion of the car. This frame structure terminates at the end of the body portion instead of projecting beyond the same to form the platform supports, as is customary in the present car construction. The body portion of the car is provided at either or both ends with a platform extension and in the type of car here illustrated this extension supports and forms a part of a vestibule. This platform extension or vestibule is constructed complete in itself and separate from the car body, it being so shaped and constructed as to fit snugly against the end of the car, to correspond to the shape of the car and to complete the construction of the car when applied to the body portion thereof. The extension comprises longitudinal extension sills 20 which are rigidly secured at their forward ends to the transverse nose piece 23, which forms the extreme end of the frame of the car as a whole, and are secured at their rear ends to the main sills 28 of the body portion of the car.

The vestibule comprises a frame work built up on the sills and nose piece. In the all steel construction, as shown in Figs. 1, 3 and 5, the vestibule comprises an outer frame consisting of vertical corner posts 6 and intermediate posts 7, these posts being covered and connected one with the other by suitable metal sheathing 8 and corner plates 9. It will be noted that these intermediate posts 7 are formed of heavy steel beams securely fastened above and below and serving to provide an extra strong construction which will transmit any shock imposed thereon to the extension sills 20. The extension or vestibule in this form of the car is not provided with a rear wall but fits snugly against the end wall of the car which constitutes the rear wall of the vestibule.

In the combined wood and steel construction, shown in Figs. 2, 4 and 6, the vestibule comprises an outer wall constructed of vertical corner posts 10 and intermediate posts 11 which are covered with sheathing, either wood or metal, and are provided with corner pieces 12 of any suitable character. In this form of the car the vestibule is also provided with a rear wall separate from the rear wall of the body portion of the car, this wall comprising corner posts 13 and door posts 14 with such intermediate posts as may be desired. This inner wall is covered with a sheathing 15 of any suitable character to provide a finished appearance to this wall of the vestibule.

The roof of the vestibule is substantially the same in both forms of the car and comprises the lower deck 5ª and the upper deck 6ª which form a continuation of the corresponding parts of the car body. The joints between the roof sections of the body portion of the car and the vestibule may be of any suitable character and are here shown as closed by a cap or molding 32. The inner walls of the vestibule may be secured to the end wall of the body portion of the car in any suitable manner but the extension sills, which form the support for the platform or vestibule, are so connected to the body portion of the car as to permit them to have longitudinal movement relatively thereto under abnormal shock or strain. Preferably, the extension sills are connected directly to the adjacent ends of the main sills. The connection may be of any suitable character but is preferably a separable one and, as here shown, the inner ends of the extension sills overlap the adjacent portions of the main sills and are provided with a series of openings or bolt holes 26 adapted, when the vestibule has been placed in position, to register with the corresponding bolt holes 27 in the adjacent portions of the main sills. The respective sills are then connected one to the other by means of bolts or rivets, thus forming a connection which is rigid and of sufficient strength to withstand all normal strains or shocks. The outer ends of the supplemental sills are connected with the nose piece 23 in such a manner as to form a rigid connection which will effectually prevent movement of the nose piece relatively to the sill. In Fig. 3, which shows the all steel vestibule construction, this connection is formed by cutting away the upper portion of the outer end of each sill and bending a portion of the sill horizontally to form a seat for the nose piece, and to which the nose piece may be bolted, this lip or seat being shown at 25. In Fig. 4, which shows the combined wood and steel construction of the vestibule, the metal casing for the wooden sill is bent in substantially the same manner as is the sill itself in Fig. 3, as shown at 25$^a$. In both forms the nose piece rests upon the seat formed at 25 and bears against the end of the sill. Consequently, any shock to which the nose piece may be subjected will be transmitted directly to the extension sills. The connection between the extension sills and the main sills is, as stated, of such strength that it will yield or separate under abnormal shock or strain, and where bolts or rivets comprise the separable connection the yielding is accomplished by the shearing or cutting off of the bolts or rivets. The connection between the extension sills and the main sills having been separated to permit the extension sills to move longitudinally to the main sills the structure of the platform and vestibule will be crushed or collapsed between the ends of the cars and in so doing will absorb a large amount of the shock, thereby materially reducing the force of the impact between the ends of the body portions of the cars. It will be noted in this connection that the end of the car proper is of a very strong construction comprising, as shown, a number of heavy steel sections which form the door posts 16, corner posts 17 and intermediate posts 18, which posts are, in the combined wood and steel construction shown in Figs. 2 and 6, further reinforced by the wooden posts with which they are combined. The intermediate posts are further reinforced by angle irons 21 riveted to the inside edges of the same, as shown. These reinforcing angle irons are of such length that they extend a considerable distance above the frame or base of the car and above the point of greatest shock when the cars attempt to telescope, thereby materially stiffening and strengthening that portion of the car which is subjected to the greatest shock or strain. Further, it will be noted that practically the entire end of the body portion of the car is covered by a heavy steel plate 19 extending from the under side of the roof down to the body of the end sills or frame of the car. This construction serves to further strengthen the end of the car, hold the end posts in proper positions and prevent parts of the vestibule from piercing the end of the car when the vestibule is crushed or collapsed. In the steel construction of the car, as shown in Figs. 1 and 5, these plates 19, which form the end wall of the body portion of the car, also form the inner wall of the vestibule, while in the combined wood and steel construction of Figs. 2 and 6 the plates 19 are interposed between the frames for the end wall of the body portion and the adjacent wall of the vestibule.

The body portion of the car is so constructed that in case of collision where the shock is not wholly absorbed by the collapsible or crushable platform the crushing in of the end of the body portion of the car will tend to draw downward the adjacent portion of the roof, thus tending to prevent the telescoping of the cars and interposing an additional protection between the passenger compartment and the car or locomotive with which the particular car is in collision. In the present construction this is accomplished by means of the end plates 19, the upper edges of which are turned at an angle to form flanges 19$^a$ (see Fig. 9) and riveted or otherwise rigidly secured to the under side of the roof. The lower edges of the plates 19 are also turned at an angle to the plates to form flanges which extend under the end sill or cross piece of the car body and are rigidly secured thereto. By means of this construction in case the collapsing of the platform or vestibule does not wholly absorb the shock the end of the car roof would be pulled downward, thus interposing the roof between the approaching locomotive or car and tend to force this locomotive or car upward and over the body portion of the car instead of through the end of the same. To further strengthen the end of the body portion of the car and to render the same more rigid braces may be employed which are shown in Figs. 5 and 6 as triangular braces arranged between the corner posts and side sills, as indicated at 22, and extending some distance above the sill so that they serve to project the end of the car should it receive a cornering blow, and also to reinforce the sides and ends of the car proper.

In order to prevent one car climbing over or riding the other we have provided an anti-climbing device which comprises heavy pressed steel pieces or beams 29 which are arranged below the nose piece 23 and have their outer ends substantially flush with the outer surface of the nose piece. These beams or steel pieces form a part of the detachable platform or vestibule and may be rigidly secured thereto in any suitable manner. There are preferably two of these pieces and they extend from the nose piece to a point some distance back of and under the adjacent portion of the car, their rear ends being secured to one of the transverse members 30 of the car frame. The pieces or beams 29 are so arranged in the several cars that when the cars are coupled into a train the pieces 29 on adjacent cars will be in alinement and in case of collision or other accident which forces the ends of the cars violently together, these pieces on adjacent cars will come in contact one with the other. Inasmuch as these pieces depend some distance below the nose piece they counteract the tendency of the cars to pivot upon the nose piece and to be lifted from the ground by the force of the collision. These pieces are connected with the platform in such a manner that the nose piece will receive the force of the collision, but at the same time they are substantially flush with the outer edge of the nose piece so that they will have the desired effect. If the platform is crushed, of course, the pieces 29 are forced backward with the platform beams and the nose piece. The connections between these plates or anti-climbing devices and the cross piece 30 are such that they will be broken or separated under a strain sufficient to disconnect the extension sills from the main sills, thus permitting the whole vestibule and platform structure to collapse. Further, these beams or anti-climbing devices serve to confine the shock or thrust to the lower portion of the car body where it will be resisted by the frame or base construction of the car and the upright members near their points of connection with this base where they have the greatest resisting power.

It will be apparent, therefore, that we have designed a car, the platform extension or vestibule of which is adapted to be crushed or collapsed under severe shock before the body portion of the car will be subjected to injury and that this crushing or collapsing of the vestibule or platform extension will absorb a large part of the shock, thus eliminating or materially lessening the ultimate damage to the body portion of the car. Further, it will be apparent that in accomplishing this we provide a supporting frame for the platform or vestibule, such as the extension sills, which is connected with the frame, or main sills, of the body portion of the car. Although this connection is strong enough to withstand all service shocks and strains it constitutes the weakest point of the construction and hence will be the first point to yield under an abnormal shock, thereby permitting the vestibule construction or platform to be crushed. The strong upright posts forming the outer end wall of the vestibule, together with the nose piece and anti-climbing devices which are secured to the same, serve to confine the shock of a collision largely to the lower portion or frame of the body portion of the car which has the greatest resisting power. Further, these features tend to prevent either the telescoping or climbing of one car by another. Also, it will be noted that the connection between the roof and the base of the car is such that if the end of the car is crushed in there will be a tendency to pull down the end of the roof and interpose the same between the body portion of the car and the car or locomotive which is in collision therewith, thus not only interposing an additional resistance but tending to cause the colliding car or locomotive to ride over the car instead of telescoping the same.

While we have shown and described one form of the invention, modified slightly to adapt it to an all steel or to a combined wood and steel car construction, it will be understood that this embodiment has been chosen for the purpose of illustration only and that the construction and arrangement of the various parts entering into the structure as a whole are capable of wide modification without departing from the spirit of the invention which consists broadly in providing a platform extension or vestibule which will yield under abnormal shock and will act as a cushion or shock absorber to prevent or reduce injury to the body portion of the car.

Having thus fully described our invention, what we claim as new and desire to secure by Letters Patent, is:—

1. In a car, a body portion and a yieldable extension to said body portion, said yieldable extension being of sufficient strength to resist normal shocks, but being so constructed and arranged that when subjected to abnormal shock it will yield along a line substantially parallel to the length of the car.

2. In a car, a body portion and an extension to said body portion, said extension being of less strength than said body portion and so constructed and arranged as to be crushed or collapsed against said body portion when subjected to abnormal shock, thereby absorbing the shock and protecting the body portion of the car from injury.

3. In a car, a body portion, an extension to said body portion, said extension being separate from and connected to said body portion, and separable means for connecting said extension to said body portion, said extension further being arranged to move along a line substantially parallel with the length of the car when said connecting means are separated, whereby an abnormal shock will separate said connection and crush said extension against the end of the body portion of the car.

4. In a car, a body portion and an extension to said body portion, said extension being formed separate from said body portion, and a yielding connection between said body portion and said extension, whereby an abnormal shock will cause said connection to yield and permit said extension to be crushed against the end of the body portion of the car.

5. In a car, a body portion, and an end portion, said end portion being of less strength than the body portion, and a yielding connection between said end portion and said body portion, said connection being of a strength sufficient to resist normal shocks but adapted to yield under an abnormal shock to permit the end portion to be crushed and to absorb a portion of said shock.

6. In a car, a body portion comprising a longitudinally extending main sill, an extension to said body portion comprising a longitudinal extension sill, and a separable connection between said extension sill and said main sill, said connection being adapted to permit said extension sill to move relatively to said main sill when subjected to an abnormal shock.

7. In a car, a body portion comprising longitudinally extending main sills, an extension to said body portion comprising longitudinal extension sills having their inner portions overlapping the adjacent portions of the respective main sills, and bolts or rivets connecting said extension sills to the respective main sills, whereby under abnormal shock said bolts or rivets will be sheared and said extension sills permitted to move longitudinally relatively to said main sills.

8. In a car, a body portion comprising longitudinally extending main sills, an extension to said body portion comprising longitudinal extension sills overlapping the adjacent portions of the main sills, a separable connection between said extension sills and the main sills, and a vestibule structure supported by said extension sills, said vestibule structure being separate from and detachably secured to the body portion of said car and forming a continuation of said body portion.

9. In a car, a body portion, and a vestibule built separate from and detachably connected to the end of said body portion.

10. In a car, a body portion comprising a main sill, an extension to said body portion comprising extension sills, separable connections between said extension sills and said main sills, constructed and arranged to withstand normal strains but to separate under abnormal strains, a nose piece extending transversely to said car and rigidly secured to said extension sills, whereby any shock imposed upon said nose piece will be transmitted to said sills through said separable connections.

11. In a car, a body portion comprising main sills and having an end wall comprising a reinforcing plate, a platform extension to said body portion comprising extension sills and separable connections between said extension sills and said main sills, said separable connections being adapted to yield under abnormal strain.

12. In a car, a body portion, a platform extension, a yieldable connection between said extension and said body portion to permit the extension to collapse under abnormal strain, and a reinforcing plate interposed between said platform extension and said body portion.

13. In a car, a body portion comprising a base frame and a roof, a yielding platform extension for said body portion, and a reinforcing plate interposed between said platform extension and the body portion of said car, said plate being rigidly connected at its upper edge to said roof and at its lower edge to said base frame, whereby the bending of said plate will tend to draw downward the roof of said car.

14. In a car, a body portion comprising a base frame, a roof and an end wall, a yieldable platform extension to said body portion, and means for drawing down the end of said roof when the end wall of said body portion is forced inward.

15. In a car a body portion comprising a base frame, and a platform extension to said body portion comprising a transverse frame member at the outer end thereof, longitudinal beams secured to said extension and having their ends substantially flush with and extending below said frame member, said beams extending beyond the inner end of said extension and having their inner ends secured to the base frame of said body portion.

16. In a car, a body portion, and a crushable platform extension yieldably connected to said body portion, said extension having at its outer end downwardly extending portions rigidly secured thereto and adapted to resist the tendency of said car to climb when subjected to abnormal lengthwise shock and to cause said shock to be imposed directly upon said extension to crush the same against the end of the car.

In testimony whereof, we affix our signatures in presence of two witnesses.

ARTHUR J. STEVENS.
JAMES H. HORNE.

Witnesses:
D. C. WILLIAMSON,
F. C. LITTLE.